US008145649B2

(12) United States Patent
Murdock et al.

(10) Patent No.: US 8,145,649 B2
(45) Date of Patent: *Mar. 27, 2012

(54) METHOD FOR SELECTING ELECTRONIC ADVERTISEMENTS USING MACHINE TRANSLATION TECHNIQUES

(75) Inventors: Vanessa Murdock, Barcelona (ES); Massimiliano Ciaramita, Barcelona (ES); Vassilis Plachouras, Barcelona (ES)

(73) Assignee: Yahoo! Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/970,757

(22) Filed: Dec. 16, 2010

(65) Prior Publication Data
US 2011/0087680 A1   Apr. 14, 2011

Related U.S. Application Data

(63) Continuation of application No. 11/926,568, filed on Oct. 29, 2007.

(51) Int. Cl.
*G06F 7/00* (2006.01)
*G06F 17/30* (2006.01)

(52) U.S. Cl. .................. 707/749; 707/750; 707/751

(58) Field of Classification Search .................. 707/749, 707/750, 751, 748, 731, 732
See application file for complete search history.

(56) References Cited

U.S. PATENT DOCUMENTS

| | | | |
|---|---|---|---|
| 5,442,778 A | 8/1995 | Pedersen et al. | |
| 6,564,202 B1 | 5/2003 | Schuetze et al. | |
| 6,675,159 B1 | 1/2004 | Lin et al. | |
| 6,721,451 B1 | 4/2004 | Ishitani | |
| 6,915,009 B2 | 7/2005 | Foote et al. | |
| 7,124,093 B1 | 10/2006 | Graham et al. | |
| 7,444,328 B2 | 10/2008 | Starbuck | |
| 7,493,273 B1 | 2/2009 | Devlin et al. | |
| 7,912,843 B2 * | 3/2011 | Murdock et al. | 707/749 |
| 2005/0022106 A1 | 1/2005 | Kawai et al. | |

OTHER PUBLICATIONS

U.S. Appl. No. 11/926,568, filed Oct. 29, 2007, Murdock et al.

* cited by examiner

*Primary Examiner* — Vincent Boccio
(74) *Attorney, Agent, or Firm* — Stattler-Suh PC (57) ABSTRACT

A system for selecting electronic advertisements from an advertisement pool to match the surrounding content is disclosed. To select advertisements, the system takes an approach to content match that takes advantage of machine translation technologies. The system of the present invention implements this goal by means of simple and efficient machine translation features that are extracted from the surrounding context to match with the pool of potential advertisements. Machine translation features used as features for training a machine learning model. In one embodiment, a ranking SVM (Support Vector Machines) trained to identify advertisements relevant to a particular context. The trained machine learning model can then be used to rank advertisements for a particular context by supplying the machine learning model with the machine translation features measures for the advertisements and the surrounding context.

20 Claims, 2 Drawing Sheets

METHOD FOR SELECTING ELECTRONIC ADVERTISEMENTS USING MACHINE TRANSLATION TECHNIQUES

RELATED APPLICATIONS

This patent application claims benefit to and is a continuation of the U.S. patent application entitled "Method for Selecting Electronic Advertisements Using Machine Translation Techniques," having Ser. No. 11/926,568, filed on Oct. 29, 2007.

FIELD OF THE INVENTION

The present invention relates to the field of electronic advertising. In particular the present invention discloses techniques for analyzing, selecting, and displaying electronic advertisements to match the surrounding context of the electronic advertisement using machine translation techniques.

BACKGROUND OF THE INVENTION

The global Internet has become a mass media on par with radio and television. And just like radio and television content, the content on the Internet is largely supported by advertising dollars. The main advertising supported portion of the Internet is the "World Wide Web" that displays HyperText Mark-Up Language (HTML) documents distributed using the HyperText Transport Protocol (HTTP).

Two of the most common types of advertisements on the World Wide Web portion of the Internet are banner advertisements and text link advertisements. Banner advertisements are generally images or animations that are displayed within an Internet Web page. Text link advertisements are generally short segments of text that are linked to the advertiser's Web site.

As with any advertising-supported business model, there needs to be some metrics for assigning monetary value to advertising on the World Wide Web. Radio stations and television stations use listener and viewer ratings services that assess how many people are listening to a particular radio program or watching a particular television program in order to assign a monetary value to advertising on that particular program. Radio and television programs with more listeners or watchers are assigned larger monetary values for advertising since more people get exposed to the advertisement. With Internet banner type advertisements, a similar metric may be used. For example, the metric may be the number of times that a particular Internet banner advertisement is displayed to people browsing various Web sites. Each display of an Internet advertisement to a Web viewer is known as an "impression."

In contrast to traditional mass media, the Internet allows for interactivity between the media publisher and the media consumer. Thus, when an Internet advertisement is displayed to a Web viewer, the Internet advertisement may include a link that points to another Web site where the Web viewer may obtain additional information about the advertised product or service. Thus, a Web viewer may 'click' on an Internet advertisement (place a cursor on the advertisement and then press a button) to be directed to a Web site designated by the advertiser that contains additional information on the advertised product or service. When a Web viewer selects an advertisement, this is known as a 'click through' since the Web viewer 'clicks through' the advertisement to see the advertiser's designated Web site. Advertising services record every click-through that occurs for an Internet advertisement.

A click-through on an Internet advertisement clearly has value to the advertiser since an interested Web viewer has indicated a desire to see the advertiser's Web site. Thus, an entity wishing to advertise on the Internet may wish to pay for such click-through events instead of paying for displayed Internet advertisements. Many Internet advertising services have therefore been offering Internet advertising wherein advertisers only pay for Web viewers that click on the Web based advertisements. This type of advertising model is often referred to as the "pay-per-click" advertising model since the advertisers only pay when a Web viewer clicks on an advertisement.

With such pay-per-click advertising models, Internet advertising services must display advertisements that are most likely to capture the interest of the Web viewer to maximize the advertising fees that may be charged. In order to achieve this goal, it would be desirable to be able to select Internet advertisements that most closely match the context that the advertising is being displayed within. In other words, the Internet selected advertisement should be relevant to the surrounding content on the Web site. Thus, advertisements are often placed in contexts that match the product at a topical level. For example, an advertisement for running shoes may be placed on a sport news page. Information retrieval systems have been designed to capture simple versions of such "relevance." Examples of such information retrieval systems can be found in the book "Modern Information Retrieval" by Baeza-Yates, R. and Ribeiro-Neto, B. A., ACM Press/Addison-Wesley. 1999.

However, the language of advertising has evolved in a manner that often makes it difficult to easily determine relevance. For example, modern advertisements seek to communicate the maximum information in the fewest possible words. Advertisements are designed to be memorable, to elicit emotions or associations, to provide key information, and to imply meaning. But all of these objectives should be achieved with a small number of words.

Because of the brevity of modern advertisements, words are very carefully chosen so as to imply information without necessarily stating it directly. For example, the slogan "I can't believe it's not butter!" implies that butter is preferable, and that this product is indistinguishable from butter. Furthermore, advertisers make use of slogans or cultural associations to carry the advertising message, such as the slogan "Got milk?".

The brevity of modern advertisements presents a challenge to contextual advertisement selection systems. Since there are few terms in a modern advertisement representation, an advertisement may not contain any terms directly identifying the product or product category. In fact, a modern advertisement representation may not directly contain any content terms. Traditional information retrieval techniques will largely fail in these cases because of the inherent compactness and brevity of the advertisement representation. Understanding a modern advertisement involves inference processes that can be quite sophisticated and well beyond what traditional information retrieval systems are designed to cope with. Due to these difficulties, it would be desirable to have advertisement selection systems that extend beyond simple concepts of relevance handled by existing information retrieval systems.

SUMMARY OF THE INVENTION

Methods for ranking and selecting contextually matching electronic advertisements from a pool of available advertisements using machine translation technologies are disclosed. The selection of contextually matching advertisements is generally referred to as the "content match" problem. Modern advertisements generally provide only a limited amount of text (typically a few keywords, a title and brief description) such that it can be very difficult to accurately select matching advertisements. Furthermore, a content match based advertisement-selection system needs to identify relevant advertisements quickly and efficiently on the basis of this very limited amount of information.

To select advertisements, the system of the present invention takes a translation approach to content match that focuses on capturing subtler linguistic associations between the surrounding content and the content of the advertisement. With the translation approach, the advertisement and the context page are considered to have different vocabularies. To bridge the gap, the system of the present invention attempts to learn a "translation" between the two.

The system of the present invention implements this goal by means of identifying various machine translation features that are determined from the advertisement and potential surrounding context. A set of machine translation features is used for training a machine learning model. In one embodiment, a ranking SVM (Support Vector Machine) is trained to identify advertisements relevant to a particular context. Once trained, the model is used to rank advertisements for a particular context by supplying the trained machine learning model with the machine translation features for the advertisements and the surrounding context.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION

The disclosure of U.S. patent application entitled "Method for Selecting Electronic Advertisements Using Machine Translation Techniques," having Ser. No. 11/926,568, filed on Oct. 29, 2007, is expressly incorporated herein by reference.

Methods for analyzing, selecting, and displaying electronic advertisements using machine translation techniques are disclosed. In the following description, for purposes of explanation, specific nomenclature is set forth to provide a thorough understanding of the present invention. However, it will be apparent to one skilled in the art that these specific details are not required in order to practice the present invention. For example, although the present invention is mainly disclosed with reference to advertisements placed in the World Wide Web aspect of the Internet, the same techniques can easily be applied in other situations. Specifically, the techniques of the present invention can be used in any application that requires ranking the relevance of some groups of text to a surrounding text. Thus, the present invention could be used in other applications that require matching advertising text to other surrounding content.

Advertising Support for Commercial World Wide Web Sites

The World Wide Web portion of the global Internet has become a mass media that largely operates using advertiser sponsored Web sites. Specifically, Web site publishers provide interesting content or services that attract Web site visitors and the Web site publishers intersperse paid advertisements into the Web pages of the Web site. The fees from the advertisers compensate the Web site publishers for creating the interesting content or services that attract the Web site visitors.

Some Internet Web site advertisements are 'banner advertisements' consisting of an advertiser-supplied image or animation. Other Internet Web site advertisements merely consist of simple short strings of text. One thing that most Internet Web site advertisements have in common is that the Internet advertisements contain a hyperlink (also known as 'link') to another Web site such that the person viewing the Internet advertisement may click on the Internet advertisement to be directed to a Web site designated by the advertiser. In this manner, the advertisement viewer can click on an advertisement to go to a Web site with far more information on the product or service in the advertisement.

Figure 1:
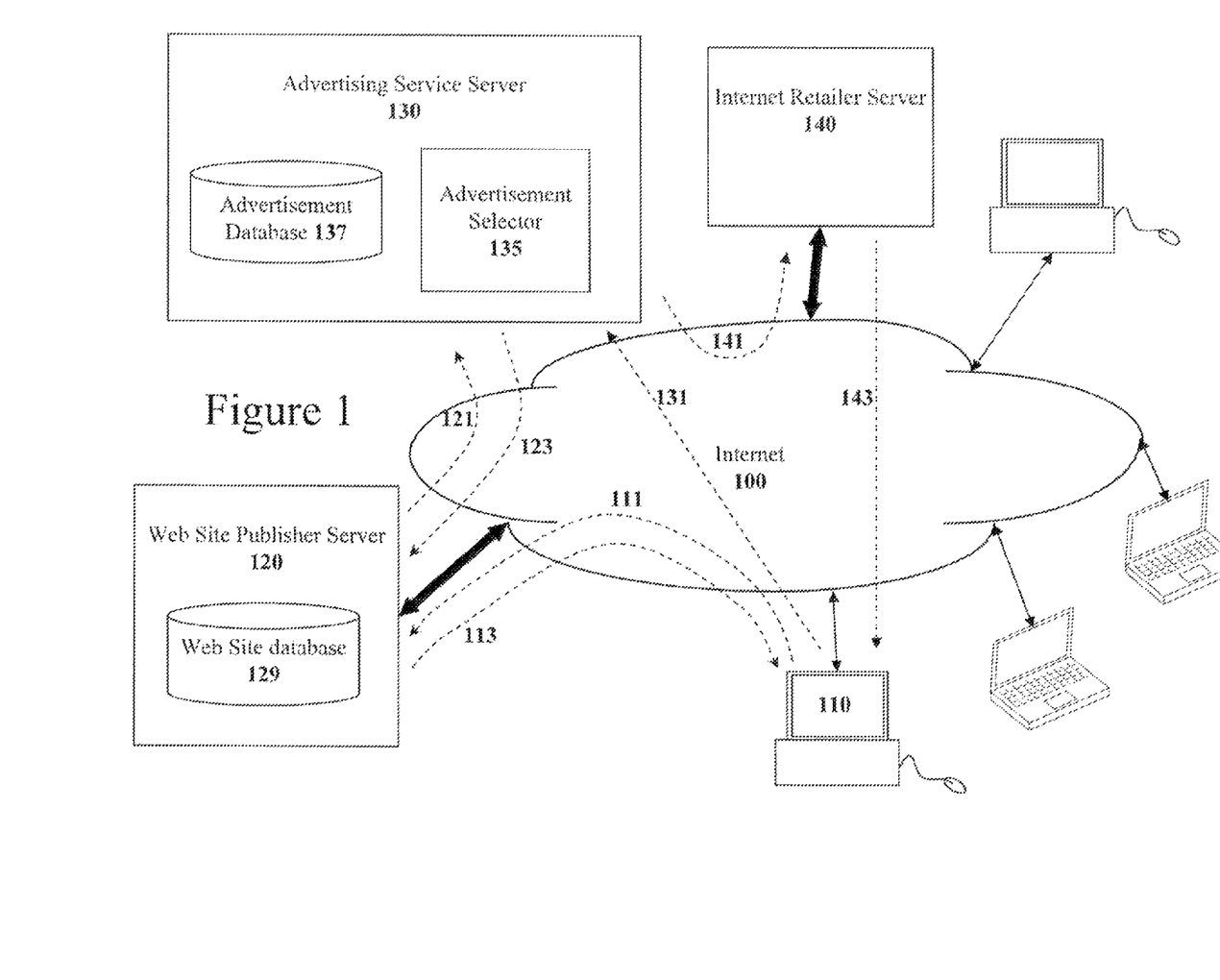
FIG. 1 illustrates a conceptual diagram of a user at a personal computer system accessing a Web site server on the Internet that is supported by an advertising service.

The Internet advertisements within an advertisement-supported Web site are generally provided to a Web site publisher by an external Internet advertising service. FIG. 1 illustrates conceptual diagram of how an advertisement-supported Web site publisher and an Internet advertising service cooperate in order to select and display Internet advertisements.

Referring to FIG. 1, an Internet-based retailer server 140 that sells products to Internet-based customers may sign up with an Internet advertisement service 130 in order to promote the Web site 140 of the Internet based retailer. When an Internet user at personal computer 110 is browsing a Web site published by Web site publisher server 120, the Internet user may be exposed to an advertisement from Internet advertisement service 130 that advertises the offerings of the Internet retailer 140.

If the Internet user at personal computer 110 is sufficiently interested in the Internet advertisement, the Internet user may click on the advertisement such that the user will be re-directed to the Web site of Internet retailer server 140. The Internet user will be re-directed to the Internet retailer server 140 through an advertising service server 130 such that advertising service server 130 will record the user's click on the advertisement in order to bill the advertiser for the user's click on the advertisement. Once the Internet user has been re-directed to the Internet retailer server 140, the user at personal computer 110 may purchase goods or services directly from the Internet retailer server 140.

Referring to the Internet advertising example illustrated in FIG. 1, the Internet retailer 140 obtains some benefit when any Internet user views an advertisement for the Internet retailer's Web site since it builds brand awareness for Internet retailer 140. However, Internet retailer 140 obtains a greater benefit from Internet-based advertisements when an Internet user clicks on the Internet advertisement and directly visits the Internet Retailer Web site 140. Thus, the Internet retailer would ideally only like to pay for Internet advertisements when Web viewers click on the Internet advertisements. In response, many Internet advertising services have begun to offer Internet advertising on such a "pay-per-click" basis wherein advertisers only pay for Internet advertisements when Internet users click on an advertiser's Internet advertisement.

In order to maximize the advertising revenue collected in such pay-per-click Internet advertising business models, an Internet advertising service 130 includes advertisement selector 135 to individually select Internet advertisements from an advertisement database 137 that will most appeal to each individual Web viewer. Selecting an appealing advertisement will increase the probability of a Web viewer clicking on the advertisement and thus resulting in higher income for the Internet advertising service 130.

One common method of selecting an Internet advertisement may be to examine the contents of the advertising-supported Web page that the Internet user at personal computer 110 selected and attempt to select an Internet advertisement that closely complements the content of that Web page selected by the user through use of advertisement selector 135 and advertisement database 137 on the advertising service 130. This technique of selecting an Internet advertisement to closely match the surrounding Web site content is often referred to as "content match."

The Content Match Advertisement Selection Problem

Content match involves selecting a relevant advertisement for placement within a surrounding context. In an Internet embodiment, context match involves selecting an Internet advertisement for placement within a Web page that will be referred to as the "target page." The typical elements of an Internet advertisement are a set of keywords, a title, a textual description, and a hyperlink pointing to a Web page associated with the advertisement. The Web page associated with the advertisement is commonly referred to as the "landing page" since that is the location wherein a user will land if the user clicks on the advertisement. Web pages have a title, content text, a set of assigned keywords, and other textual features.

Overall Problem to Address

In general, the content match problem for an advertisement placing system can be formalized as a ranking task. Let A be a set of advertisements and P be the set of possible target pages. A target page-advertisement pair (p,a), $p \in P, a \in A$, (an observation) can be represented as a vector of real-valued features $x=\Phi(p,a)$. The real-valued features are derived from the advertisement, the target page, or a combination of the advertisement and the target page. $\Phi$ is a feature map in a d-dimensional feature space $X \subset R^d$; i.e., $\Phi: A \times P \to X$. An example of a useful feature for ranking page-advertisement pairs is the well-known vector cosine similarity between the advertisement and the target page, possibly weighting each word's contribution with traditional term frequency-inverse document frequency (tf-idf) schemes.

The main objective of content match is to find a ranking function $f: \Phi(p,a) \to R$ that assigns scores to pairs (p,a) such that advertisements relevant to the target page are assigned a higher score than less relevant advertisements. If one takes as $\Phi$ a function that extracts a single feature (such as the cosine similarity between the advertisement and the target page) then $f$ is a traditional information retrieval ranking function. However, the present invention instead concerns ranking functions $f_\alpha$ that are parameterized by a real-valued vector $\alpha \in E R^d$ that weighs the contribution of each feature individually. In particular, the present invention addresses machine learning approaches to ranking advertisements in which the weight vector $\alpha$ is learned from a set of evaluated rankings using machine learning.

Optimization Approach to the Problem

In one embodiment of the advertisement ranking task, the advertisement-placing system is given a target page p and then uses the ranking function to score all of the possible target page-advertisement pairs $(p,a_i)$, $\forall a_i \in A$. Advertisements are then ranked by the score $f_\alpha(p,a_i)$. Since the pool of advertisements can be very large, it may be difficult to perform all the needed calculations in real-time. Thus, in one embodiment, a screening system may be used to perform an initial quick assessment to select the best N advertisements from the entire advertisement pool for the target page. The number N may vary. Various different methods may be used for performing the initial quick screening.

Overview of the Proposed System

Earlier efforts to perform content match have largely focused on traditional information retrieval notions of relevance. For example, an information retrieval system may determine the relevance of an advertisement with respect to a target page based only on a cosine similarity function with term frequency-inverse document frequency (tf-idf). However, the limited context provided by the advertisements, and the huge variance in type and composition of target pages may pose a considerable vocabulary mismatch. Thus, such simple single feature information retrieval based systems are very limited in their ability to accurately assess the relevance of advertisements to their surrounding context.

The system of the present invention capitalizes on machine translation methods in order to overcome the difficulties that may be presented by a vocabulary mismatch. Thus, proper modeling correlation at the lexical level could capture such useful associations.

The present invention introduces an advertisement-placing system that exploits machine translation by means of simple and efficient features. In the system of the present invention, a feature map extracts several properties of a target page-advertisement pair. The feature map may include traditional information retrieval features such as the cosine similar feature in addition to the machine translation features. All of the various features are used for training a machine learning model that will be used to perform ranking of how well an advertisement fits within a particular context. In the disclosed embodiment, the machine learning model is a Support Vector Machine (SVM), however other machine learning systems may be used. The trained machine learning model can then be used to rank advertisements for a particular context by supplying the machine learning model with the machine learning and other features for the advertisements and that context.

Operation of the Proposed System

Figure 2:
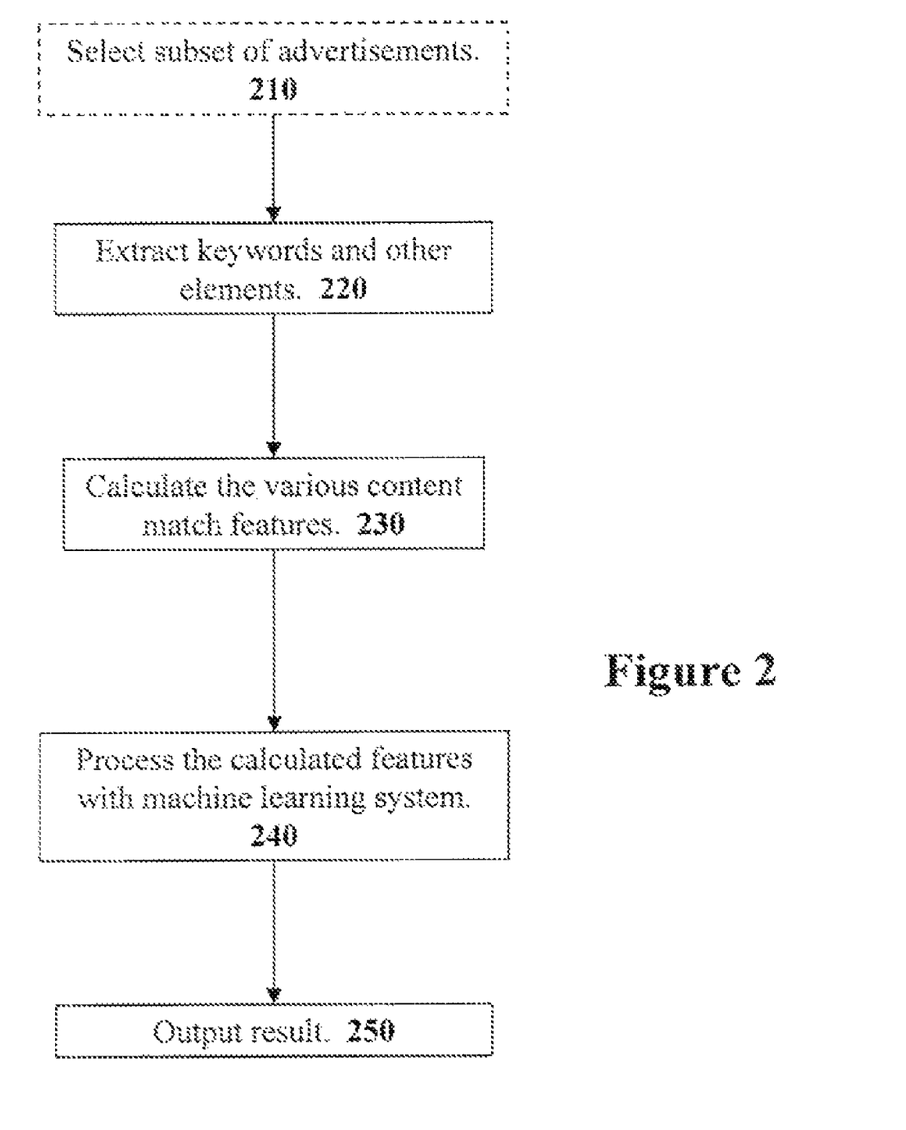
FIG. 2 illustrates a high-level flow diagram describing the operation of an advertisement analysis system that uses machine translation features with a machine learning system.

FIG. 2 illustrates a high-level flow diagram describing the operation of the advertisement selection system of the present invention. Initially at step 210, the system may use a screening system to select a subset of advertisements to be ranked according to how well they fit within the provided context. The screening system would reduce the computational load by reducing the number of candidate advertisements that need to be considered. However, note that step 210 is an optional step and the system could rank every advertisement in the advertisement pool.

Extracting Elements from Target Pages and Advertisements

Next, at step 220, the system extracts keywords and other elements required to calculate the various content match features that will be considered. To limit the number of comparisons, one embodiment may select a subset of terms from the target page and a subset of terms from the advertisement. For example, in one embodiment the keywords and the title are used from the advertisement.

Determining Content Match Features

Referring back to FIG. 2, after extracting the various elements from the target page and the advertisements, system of the present invention, such as in advertisement selector 135 (FIG. 1), then calculates the various content match features for each advertisement to be considered at step 230. The content match features will be used to evaluate how well an advertisement matches the target page. The system of the present invention may be implemented with various different embodiments that use some content match features but not other content match features. Furthermore, the following list of content match features represents just a subset of the possible content match features that may be used.

The present invention largely concerns machine translation features that are based on the "noisy channel model." The noisy channel model refers to the notion that a particular sentence spoken in one language is a garbled, noisy version of the same sentence spoken in another language. With the advertising context of the present invention, one may view a description of an advertisement as a noisy version of the text in the target page. Thus the machine translation model proposes that a "translation" between the advertisement description and its landing page text to overcome the vocabulary mismatch between the advertisement and the target page.

The content match features discussed in this document fall into three categories: standard/baseline features (based on text similarity and exact term overlap between the advertisement and the target page), a first set of machine translation features based on statistical machine translation, and a second set of machine translation features based on machine translation evaluation. The baseline features are based on the well-known cosine similarity measure and the lexical overlap of terms between the target page and the advertisement. The translation features bridge the gap between the language of the target page and the language of the advertisement by providing a mapping between the two vocabularies.

Text Similarity Feature—Cosine Similarity

The first type of feature is the text similarity between a target page and the advertisement. In one embodiment, five different features of the cosine similarity are computed. A first cosine similarity feature is calculated between the target page and the entire advertisement (a) where all advertisement fields are treated as a bag of words. Another three cosine similarity features are calculated between the target page and individual parts of the advertisement such as the advertisement title ($a_T$), the advertisement keywords ($a_K$), or the advertisement description ($a_D$). A fifth cosine similarity feature may also be obtained by comparing the target page with the landing page associated with the advertisement ($a_L$).

Before performing the cosine similarity test, the advertisements were stemmed using the Krovetz stemmer disclosed in the paper "Viewing morphology as an inference process," by Krovetz, R., in R. Korfhage et al., Proc. 16th ACM SIGIR Conference, Pittsburgh, Jun. 27-Jul. 1, 1993; pp. 191-202. Stop words were also removed. The stop words were from a list of 733 words supplied with the system described in the paper "Terrier: A High Performance and Scalable Information Retrieval Platform", by Ounis, I., Amati, G., Plachouras, V., He, B., Macdonald, C. and Lioma, C., in Proceedings of ACM SIGIR'06 Workshop on Open Source Information Retrieval (OSIR 2006). Note that these adjustments may be performed in step 220.

After the stemming process, a target page and advertisement pair (p,a) are processed with cosine-similarity measure.

In one embodiment, the cosine similarity system employed tf-idf term weights, as follows:

$$sim(p, a) = \frac{\sum_{t \in p \cap a} w_{pt} \cdot w_{at}}{\sqrt{\sum_{t \in p} (w_{pt})^2} \cdot \sqrt{\sum_{t \in a} (w_{at})^2}}$$

In the above equation, the weight $w_{pt}$ of term t in the target page p corresponds to its tf-idf score:

$$w_{pt} = tf \cdot \log\left(\frac{|P| + 1}{n_t + 0.5}\right)$$

where $n_t$ is the target page frequency of term t, and |P| is the number of target pages.

Lexical Term Overlap

The other standard/baseline content match feature determined is the overlap of keywords between the target page and the advertisement. In one embodiment, the keyword overlap system presented by Ribeiro-Neto, B., Cristo, M., Golgher, P. B. and E. S. De Moura, in the paper titled "Impedance coupling in content-targeted advertising" (Proceedings of the 28th annual international ACM SIGIR conference on Research and development in information retrieval, ACM Press, pp. 496-503, 2005) was used to determine a keyword overlap feature.

The Ribeiro-Neto system showed significant improvement by constraining the placement of advertisements such that advertisements are only placed in target pages that contain all of the advertisement keywords. This filter is too strict for a system designed to work even when there are mismatched vocabularies. Instead this constraint is encoded as a pair of binary features, rather than as a filter. To capture that constraint, we consider two complementary binary features. For a given pair, the first lexical overlap feature is 1 if all the keywords of the ad appear in the target page, otherwise it is 0. The second lexical overlap feature is the complement of the first feature, (it is 0 when all the keywords of the advertisement appear in the target page, and otherwise it is 1).

Machine Translation Features

For one embodiment, an IBM model 1 machine translation system was used, although any machine translation system could be used. In the results presented IBM Model 4 was used. Details of all IBM translation models are given in the paper "The mathematics of statistical machine translation: Parameter estimation" by P. F. Brown, S. A. Della Pietra, V. J. Della Pietra, and R. L. Mercer, Computational Linguistics, 19(2):263-311, 1993. Specifically, to construct a translation table of terms in the advertisement description one embodiment of the present invention used the implementation of IBM Model 1 known as GIZA++ presented in the paper "Statistical machine translation, final report" by Y. Al-Onaizan, J. Curin, M. Jahr, K. Knight, J. Lafferty, D. Melamed, F.-J. Och, D. Purdy, N. A. Smith, and D. Yarowsky., JHU workshop, 1999. GIZA++ is a word-based statistical machine translation system that is freely available on the Internet.

Statistical machine translation systems estimate the conditional probability that a source sentence is a translation of a target sentence, given an alignment between the two. In IBM Model 1, all alignments are considered equally likely, and the probability of an advertisement landing page, L, given an advertisement description, D, is:

$$P(L\mid D) = \frac{\in}{(d+1)^m} \sum_{a_1=0}^{d} \cdots \sum_{a_m=0}^{d} \prod_{j=1}^{m} P(L_j \mid D_{a_j}) \qquad (1)$$

where P(L|D) is maximized subject to the constraint $$\sum_L P(L\mid D) = 1 \qquad (2)$$

In the two preceding equations, 'd' is the length of the advertisement description, 'm' is the length of the advertisement landing page, and '$a_z$' is the alignment between a word in the advertisement description to a word 'z' in the advertisement landing page. In one embodiment, the system computed four features of translations between advertisement descriptions and target pages. The four statistical machine translation features can all be easily computed from the scores derived from a machine translation system.

Machine Translation—Translation Probabilities

The average of the translation probabilities of all words in the target page "translated" to all words in the advertisement description. This statistical machine translation feature is a real number between zero and one.

Machine Translation—Keyword Translation Probabilities

The average of the translation probabilities of all words in the target page "translated" to all words in the keywords for the advertisement. This statistical machine translation feature is a real number between zero and one.

Machine Translation—Translation Proportion

The translation proportion is defined as the total number of translations of advertisement terms appearing in the target page, divided by the number of advertisement terms. This statistical machine translation feature is a real number between zero and infinity with typical values being between zero and five.

Machine Translation—Keyword Translation Proportion

The keyword translation proportion is defined as the total number of translations of advertisement keywords appearing in the target page, divided by the number of advertisement keywords. This statistical machine translation feature is a real number between zero and infinity, with typical values being between zero and five.

Machine Translation Evaluation Features—BLEU score and NIST score

One issue in evaluating translations is that there are many ways to say the same thing correctly. Machine translation systems are typically evaluated by measuring the overlap between the translation and a set of gold standard translations. The BLEU metric takes the geometric mean of the n-gram precision between the gold standard and the translation, with a penalty for very short translations. The BLEU metric is fully disclosed in the paper "Bleu: a method for automatic evaluation of machine translation" by K. Papineni, S. Roukos, T. Ward, and W.-J. Zhu, Proceedings of the 40th Annual Meeting of the Association for Computational Linguistics (ACL), 2002 The BLEU metric has been shown to correlate with human assessments of translation quality.

$$BLEU = e^{\left(\sum_{n=1}^{N} w_n \log(p_n) - \max\left(\frac{L_{sys}}{L_{ref}} - 1, 0\right)\right)} \qquad (3)$$

where N=4, and wn=N−1, Lref is the number of words in the target page title, Lsys is the number of words in the advertisement title (or landing page), and pn is defined as:

$$p_n = \frac{\sum_i C_i^m}{\sum_i C_i} \qquad (4)$$

where Cmi is the number of n-grams in segment i in the advertisement title that have a matching co occurrence in segment i in the target page title, and Ci is the number of n-grams in segment i in the advertisement title.

In some embodiment, a variant of BLEU score known as the NIST score was determined as a machine learning evaluation feature. The NIST score is fully disclosed in the paper "Automatic Evaluation of Machine Translation Quality Using N-gram Co-Occurrence Statistics" (NIST Report, 2002) and presented in the following equation:

$$NIST = \sum_{n=1}^{N} \left\{ \sum_{w_1^C \ldots k} \frac{\text{Info}(w_1 \ldots n)}{\sum_{w_1^P \ldots k} (1)} \right\} \cdot \exp\left\{ \beta \log^2\left[\min\left(\frac{L_{sys}}{L_{ref}}, 1\right)\right] \right\} \qquad (5)$$

where is an n-gram of length k co-occurring in both sentences, is an n-gram of length k in the advertisement title, β is a constant that regulates the penalty for short "translations", N=5, $L_{ref}$ is the average number of words in the target page title, and $L_{sys}$ is the average number of words in the advertisement title (or landing page). "Info" is defined as:

$$\text{Info}(w_1 \ldots n) = \log^2\left(\frac{\text{count}(w_1 \ldots n-1)}{\text{count}(w_1 \ldots n)}\right)\left[\min\left(\frac{L_{sys}}{L_{ref}}, 1\right)\right] \qquad (6)$$

where the counts of the n-grams are computed over the target page title. The idea is to give less weight to very common n-grams (such as "of the") and more weight to infrequent and potentially very informative n-grams. All data were stemmed using a Krovetz stemmer [12] and lowercased before computing the score. We compute three features based on BLEU and NIST:

NIST

The NIST score between the advertisement title and the target page title. The motivation for this particular feature is that the titles are more similar to each other in length and character. The analogous feature for BLEU scores was not used because it was nearly always zero.

NIST Landing

The NIST score between the advertisement landing page and the title of the target page.

BLEU Landing

The BLEU score between the advertisement landing page and the title of the target page.

Applying the Features to a Machine Learning System

Referring back to FIG. 2, after calculating all of the different content match features to be considered in step 230, the next step is to process the content match features with a trained machine learning model at step 240. The machine learning model will output rankings for each advertisement that may be used to select the most relevant advertisement for the designated target page.

The machine learning model may be constructed using many different technologies. For example, a perception-based ranking system may be implemented according to the teachings in the paper "A New Family of Online Algorithms for Category Ranking" by Crammer, K. and Y. Singer, Journal of Machine Learning Research, 3:1025-1058, 2003. Alternatively, a boosting-based system may be implemented according to the teachings in the paper "BoosTexter: A boosting-based system for text categorization" by Schapire, R. E. and Y. Singer, Machine Learning, 39(2/3):135-168, 2000.

However, a Support Vector Machine (SVM) based system was constructed in a tested embodiment. Detailed information about Support Vector Machines can be found in "The Nature of Statistical Learning Theory" by V. N. Vapnik, Springer, 1995. Specifically, one SVM based machine learning model was constructed according to the teachings set forth in paper "Optimizing search engines using click-through data" by T. Joachims, Proceedings of the 8th ACM SIGKDD international conference on knowledge discovery and data mining, pp. 133-142, 2002.

The objective function of that system is the number of discordant pairs between a ground truth ranking and the ranking provided by the Support Vector Machine. The number of discordant pairs is minimized during the training of the Support Vector machine. Specifically, one embodiment used a Support Vector Machine (SVM) which optimizes a function directly related to Kendall's Tau, the number of concordant pairs in the candidate ranking and the gold standard ranking Most embodiments learned parameters using ten-fold cross-validation.

The Support Vector Machine was trained to learn a ranking function $f_\alpha$, used to assign a score to target page-advertisement pairs (p,a). Specifically, the defined feature map $\Phi(p,a)$ comprising the various content match features from the previous section is processed by the Support Vector Machine. The score of a target page-advertisement pair (p,a) is a linear combination of the weights associated with each feature that defines the ranking function:

$$f_\alpha(p,a) = <\alpha, \Phi(p,a)>$$

where <x,y> is the inner product between vectors x and y, and vector $\alpha$ is learned with Support Vector Machine ranking

Results of the System

The machine learning based advertising-selection system that uses machine translation features has proven to be effective at identifying advertisements that match surrounding content. In this section the results of the system are compared against information retrieval baselines as well as a machine-learning based baseline that only use text similarity matching.

Contextual advertising can be framed as a retrieval problem: The target page is a query that retrieves from an index of advertisements. Each advertisement has several fields that can be indexed separately. The top portion of Table 1 summarizes the results of an information retrieval baseline based on cosine similarity only. When considering the different fields of the advertisements, it has been determined that the title is the most effective field for computing the similarity with respect to all evaluation measures. In Table 1 the rows labeled "Advertisement" reflect the results when all fields of the advertisement, including the landing page, are treated as a unit. The row indicated "Landing" reflects the retrieval results when the advertisement is represented only by its landing page.

TABLE 1

|  | P@1 | P@3 | P@5 | Kendall's $\tau_b$ |
|---|---|---|---|---|
| Retrieval |  |  |  |  |
| Advertisement | 0.685 | 0.663 | 0.623 | 0.233 |
| Landing Page | 0.680 | 0.646 | 0.604 | 0.157 |
| SVM |  |  |  |  |
| Advertisement | 0.684 | 0.663 | 0.625 | 0.243 |
| Landing Page | 0.665 | 0.640 | 0.603 | 0.157 |
| Ad (individual fields) | 0.688 | 0.674 | 0.637 | 0.279 |

The table reports Kendall's $\tau_b$, and precision at 5, 3 and 1. Kendall's $\tau_b$, is defined with the following equation:

$$\tau_b = \frac{C - D}{\sqrt{\left(\frac{1}{2}N(N-1) - T_1\right)\left(\frac{1}{2}N(N-1) - T_2\right)}} \quad (7)$$

where C is the number of concordant pairs (the same advertisement at the same rank in both ranked lists), D is the number of discordant pairs, N is the total number of advertisements ranked, $T_1$ is the number of ties in the first ranked list, and $T_2$ is the number of ties in the second ranked list. Kendall's $\tau_b$, is more fully described in the paper "A Modification of Kendall's Tau for the Case of Arbitrary Ties in Both Rankings" by M. L. Adler, Journal of the American Statistical Association, Vol. 52, No. 277, pp. 33-35, 1957.

The bottom portion of Table 1 shows the results when the cosine similarity results are used as input features for a trained Support Vector Machine (SVM). The final row of Table 1 shows the result of computing the cosine similarity with each advertisement field individually and creating a separate feature for each cosine similarity value. As expected, there is no real difference between information retrieval and a ranking Support Vector Machine (SVM) when the similarity function is the same, as can be seen comparing the two rows labeled "Advertisement" and comparing the two rows labeled "Landing". Computing a separate feature for each advertisement field offers a small incremental improvement over the other methods. All further results in this document use a ranking Support Vector Machine (SVM) with separate cosine similarity features computed over the advertisement fields.

The Ribeiro-Neto system found that using cosine similarity between the advertisement landing page and the target Web page, with the additional constraint that the advertisement keywords must appear in the target page produced the best results. To capture this constraint, we added a pair of binary features described in the section on lexical overlap. In our data, almost none of the target pages contain all of the advertisement keywords, so we made it a feature rather than a filter. The row labeled "Advertisement+Keywords" in Table 2 shows the result of adding these features to the best performing model from Table 1. All results following use this base set of features, in addition to the features reported.

Although the cosine similarity between the target page and the landing page picks up vocabulary not used in the description of the advertisement, matching terms are weighted according to their frequency. In a translation framework, words may or may not match. For example, the translation model may learn that "mortgage" and "home" are associated with each other. Furthermore, since it trains on the entire corpus of advertisements, related words appearing in the target page and the landing page that do not appear in the advertisement description will contribute to the similarity between the target page and the advertisement. While cosine similarity estimates the contribution of a matching pair based on their term frequency with a discounting factor for the inverse document frequency for a given advertisement-target page pair, the translation model learns a probability distribution over all word pairs, and may provide a more appropriate similarity score.

TABLE 2

| SVM | P@1 | P@3 | P@5 | Kendall's $\tau_b$ |
|---|---|---|---|---|
| Advertisement | 0.688 | 0.674 | 0.637 | 0.279 |
| Advertisement + Keywords | 0.716 | 0.681 | 0.643 | 0.286 |
| Key Translation Probability | 0.703 | 0.661 | 0.624 | 0.251 |
| Key Translation Proportion | 0.723 | 0.678 | 0.639 | 0.287 |
| All Keyword Translation | 0.728* | 0.680 | 0.640 | 0.289 |
| Translation Probability | 0.737* | 0.689 | 0.643 | 0.286 |
| Translation Proportion | 0.729* | 0.682 | 0.642 | 0.285 |
| All Translation | 0.727* | 0.687 | 0.641 | 0.284 |

Table 2 shows the results of using four different statistical machine translation features. As set forth earlier, the two "Key Translation" features compute the average machine translation scores for the target page and the advertisement keywords. The other two machine translation features are computed over the advertisement description and the target page, and these features produce statistically significant improvements in precision at rank one. The best feature from this set is the average translation probability computed over the advertisement description (which includes the keywords, the title, and the summary). Combining the keyword features with the advertisement features produces results slightly worse than using no translation features.

TABLE 3

| Features used by SVM | P@1 | P@3 | P@5 | Kendall's $\tau_b$ |
|---|---|---|---|---|
| Advertisement | 0.687 | 0.676 | 0.637 | 0.279 |
| Advertisement + Keywords | 0.716 | 0.681 | 0.643 | 0.286 |
| BLEU Landing | 0.716 | 0.681 | 0.643 | 0.286 |
| NIST | 0.730* | 0.685 | 0.641 | 0.286 |
| NIST Landing | 0.729* | 0.680 | 0.639 | 0.288 |
| NIST + NIST Landing | 0.739* | 0.682 | 0.639 | 0.290 |

Table 3 lists the results of features based on the translation evaluation metrics. While the machine translation features capture related terms, the metrics NIST and BLEU give a summary of the degree to which two segments of text overlap exactly. The BLEU metric measures the overlap of 4-grams. NIST relaxes the restriction to allow for matching bigrams and trigrams. Since the advertisement and the target page are both in English, albeit different forms of English, one would expect matching n-grams to be a good indicator of topical relatedness.

In many tests, the BLEU score between the advertisement title and the target page title was zero for nearly every example. For this reason, one embodiment computed the BLEU score between the advertisement landing page and the target page title. However, a large proportion of samples still had a BLEU score of zero and thus the BLEU score did not affect the ranking function, as shown in Table 3. The NIST score, which is considerably more lenient, proved to be a good indicator of similarity between advertisements and target pages, and all of the features based on the NIST score produce statistically significant results in precision at rank one.

TABLE 4

| Features used by SVM | P@1 | P@3 | P@5 | Kendall's $\tau_b$ |
|---|---|---|---|---|
| Advertisement | 0.688 | 0.674 | 0.637 | 0.279 |
| Advertisement + Keywords | 0.716 | 0.681 | 0.643 | 0.286 |
| All Features | 0.736* | 0.685 | 0.644 | 0.299 |
| Best Trans + NIST + NIST Landing | 0.746* | 0.686 | 0.644 | 0.306 |

Table 4 lists the best performing feature combinations. In Table 4, the "Best Trans" features are the translation probability features and the keyword translation proportion features from Table 4. Thus, the best test results are produced with a combination of the advertisement translation probability, the keyword translation proportion, the NIST feature, and NIST Landing features as shown in Table 4. Using all features also produces statistically significant improvements over the results in the first row. The features resulting in significant improvements in precision are the pair of binary features that indicate the presence of all of the keywords in the target page, the features based on NIST scores, the features based on the advertisement translation probabilities, and the proportion of keywords that have translations in the target page.

Machine translation features have been demonstrated to provide statistically significant improvements for precision at rank one. Furthermore, it was found that the NIST features, which measure the degree of exact overlap, and the translation features, which measure overlap of related terms, in combination produce the best results. The tests were performed in a re-ranking context, but one would expect the features to produce greater improvements in a retrieval context where the vocabulary is broader because the pool of candidate advertisements is larger.

The results of re-ranking are biased by the initial retrieval. If the original retrieval algorithm ranks advertisements based on their textual overlap with the target page, then there will be few advertisements that exhibit a lexical mismatch. In this case, the best features indicate a high degree of lexical overlap with the system. The fact that the NIST score, which favors matching n-grams, improves results over the baseline system supports our supposition that the advertisement candidates were selected precisely because they contain the same vocabulary.

Although the re-ranking of advertisements is less than ideal because it is biased by the initial retrieval, it is not unreasonable as a real-world approach. Contextual advertising systems typically have an enormous number of advertisements to retrieve from, and it is not unreasonable that an efficient retrieval pass might be used to narrow the possible advertisement candidates. The initial retrieval pass would then be followed by a more expensive refinement in the form of a learned ranking of the most likely advertisement candidates.

The machine learning ranking function (in this embodiment an SVM) learns separate weights for each field in the advertisement, allowing the system to take advantage of the structure of both the advertisement and the target page. There are information retrieval models that allow retrieval using document fields, but it is unclear how to incorporate other, arbitrary, real-valued features in these models. Retrieval systems—with or without fields—can only use information integral to the document. It is not clear how to incorporate other features into the system.

The cosine similarity between the advertisement landing page and the target page favors pages that contain the vocabulary of the landing page, even if they don't contain the vocabulary of the advertisement description. If multiple advertisements all match the description vocabulary, advertisements matching the landing page vocabulary will be ranked more highly. Cosine similarity finds matches at the n-gram level, where n=1. NIST favors more precise matches because NIST gives a higher score to longer matching n-grams.

The machine translation model also associates the vocabulary of the target page and the vocabulary of the landing page. The benefit of the machine translation model is that it uses evidence from the complete pool of advertisements and target pages. Words that co-occur in a given ad-target page pair will be given more weight if they co-occur in many other pairs. This allows the machine translation model to down-weight co-occurring words that are less meaningful. By contrast, cosine similarity is only computed over the current pair.

Normally machine translation models require an external parallel training corpus. With one embodiment of the present invention, the translation table was constructed using no external resources. The rationale for this is that a self-contained system is more likely to be portable to other languages and other markets, making the system more flexible. If language-dependent resources are available (such as "WordNet" discussed by G. A. Miller in the paper "WordNet: A lexical database", Communications of the ACM, 38(11):39-41, 1995), or if there exists an external training corpus of advertisements and target pages known to be good matches, the translation model provides a principled way to incorporate that information.

Although we have presented a language-independent framework for contextual advertising, the features could be extended to incorporate language-specific features to improve precision. There is no reason the proposed system could not be integrated with other types of systems, such as the ontology approach proposed by A. Broder, M. Fontoura, V. Josifovski, and L. Riedel in the paper "A semantic approach to contextual advertising", Proceedings of the 30th Annual Conference on Research and Development in Information Retrieval (SIGIR), 2007.

The system of the present invention demonstrates the advantages of calculating several different content match features and applying all of the content match features within a machine learning framework. The methods employed are language independent and do not require any external resource. In the disclosed system, the key content match features are machine translation features. The machine translation features exploit relationships between terms that do not explicitly appear in both the target page and the advertisement.

The foregoing has described a number of techniques for analyzing, selecting, and displaying electronic advertisements using machine translation techniques. It is contemplated that changes and modifications may be made by one of ordinary skill in the art, to the materials and arrangements of elements of the present invention without departing from the scope of the invention.

We claim:

1. A method of determining relevance of an electronic advertisement to a target content, said method comprising:
   extracting a set of terms from said electronic advertisement and said target content;
   calculating a first content match feature using said set of terms, the first content match feature comprising a translation evaluation feature indicating a degree to which n-grams of the electronic advertisement and the target content match;
   calculating a second content match feature using said set of terms, the second content match feature comprising a translation probability feature indicating a probability that one or more terms of the electronic advertisement are related to one or more terms of the target content, wherein the one or more terms of the electronic advertisement do not match the one or more terms of the target content; and
   processing said first content match feature and said second content match feature with a machine learning model to output a relevance score indicating the relevance of the electronic advertisement to the target content, the machine learning model comprising individual weights for the first and second content match features, the machine learning model being trained using said first and second content match features and machine learning techniques.

2. The method of claim 1, wherein:
   the first content match feature comprises a BLEU metric; and
   an n-gram comprises a bigram, trigram, or 4-gram.

3. The method of claim 1, wherein:
   the first content match feature comprises a NIST metric; and
   an n-gram comprises a bigram, trigram, or 4-gram.

4. The method of claim 1, wherein said machine learning model comprises a support vector machine.

5. The method of claim 1, wherein said electronic advertisement and target content comprise different vocabularies, said first and second content match features providing a translation between said electronic advertisement and target content vocabularies.

6. A system, comprising at least one processor and memory, for determining relevance of an electronic advertisement to a target content, said system comprising:
   a server system configured for:
      extracting a set of terms from said electronic advertisement and said target content;
      calculating a first content match feature using said set of terms, the first content match feature comprising a translation evaluation feature indicating a degree to which n-grams of the electronic advertisement and the target content match;
      calculating a second content match feature using said set of terms, the second content match feature comprising a translation probability feature indicating a probability that one or more terms of the electronic advertisement are related to one or more terms of the target content, wherein the one or more terms of the electronic advertisement do not match the one or more terms of the target content; and
      processing said first content match feature and said second content match feature with a machine learning model to output a relevance score indicating the relevance of the electronic advertisement to the target content, the machine learning model comprising individual weights for the first and second content match features, the machine learning model being trained using said first and second content match features and machine learning techniques.

7. The system of claim 6, wherein:
the first content match feature comprises a BLEU metric; and
an n-gram comprises a bigram, trigram, or 4-gram.

8. The system of claim 6, wherein:
the first content match feature comprises a NIST metric; and
an n-gram comprises a bigram, trigram, or 4-gram.

9. The system of claim 6, wherein said machine learning model comprises a support vector machine.

10. The system of claim 6, wherein said electronic advertisement and target content comprise different vocabularies, said first and second content match features providing a translation between said electronic advertisement and target content vocabularies.

11. A method of determining relevance of an electronic advertisement to a target content, said method comprising:
extracting a set of terms from said electronic advertisement and said target content;
calculating a first content match feature using said set of terms, the first content match feature comprising a translation evaluation feature indicating a degree to which n-grams of the electronic advertisement and the target content match;
calculating a second content match feature using said set of terms, said second content match feature comprising a translation proportion feature indicating a proportion of related terms in the electronic advertisement and the target content; and
processing said first content match feature and said second content match feature with a machine learning model to output a relevance score indicating the relevance of the electronic advertisement to the target content, the machine learning model comprising individual weights for the first and second content match features, the machine learning model being trained using said first and second content match features and machine learning techniques.

12. The method of claim 11, wherein:
the first content match feature comprises a BLEU metric; and
an n-gram comprises a bigram, trigram, or 4-gram.

13. The method of claim 11, wherein:
the first content match feature comprises a NIST metric; and
an n-gram comprises a bigram, trigram, or 4-gram.

14. The method of claim 11, wherein said machine learning model comprises a support vector machine.

15. The method of claim 11, wherein said electronic advertisement and target content comprise different vocabularies, said first and second content match features providing a translation between said electronic advertisement and target content vocabularies.

16. A system, comprising at least one processor and memory, for determining relevance of an electronic advertisement to a target content, said system comprising:
a server system configured for:
extracting a set of terms from said electronic advertisement and said target content;
calculating a first content match feature using said set of terms, the first content match feature comprising a translation evaluation feature indicating a degree to which n-grams of the electronic advertisement and the target content match;
calculating a second content match feature using said set of terms, said second content match feature comprising a translation proportion feature indicating a proportion of related terms in the electronic advertisement and the target content; and
processing said first content match feature and said second content match feature with a machine learning model to output a relevance score indicating the relevance of the electronic advertisement to the target content, the machine learning model comprising individual weights for the first and second content match features, the machine learning model being trained using said first and second content match features and machine learning techniques.

17. The system of claim 16, wherein:
the first content match feature comprises a BLEU metric; and
an n-gram comprises a bigram, trigram, or 4-gram.

18. The system of claim 16, wherein:
the first content match feature comprises a NIST metric; and
an n-gram comprises a bigram, trigram, or 4-gram.

19. The system of claim 16, wherein said machine learning model comprises a support vector machine.

20. The system of claim 16, wherein said electronic advertisement and target content comprise different vocabularies, said first and second content match features providing a translation between said electronic advertisement and target content vocabularies.

\* \* \* \* \*